United States Patent
Bredius

(10) Patent No.: US 6,639,947 B1
(45) Date of Patent: Oct. 28, 2003

(54) EMI REDUCTION FOR ISOLATED BUS SYSTEMS

(75) Inventor: Martijn Bredius, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/473,541

(22) Filed: Dec. 28, 1999

(51) Int. Cl.⁷ .................................................. H04B 3/00
(52) U.S. Cl. ..................................................... 375/258
(58) Field of Search ........................ 375/258; 370/296; 361/42; 363/97

(56) References Cited

U.S. PATENT DOCUMENTS

| | | | | |
|---|---|---|---|---|
| 3,875,332 A | * | 4/1975 | Fletcher et al. | 370/296 |
| 4,882,646 A | * | 11/1989 | Genuit | 361/42 |
| 5,420,886 A | * | 5/1995 | Ohmori | 375/258 |
| 5,533,054 A | | 7/1996 | De Andrea et al. | |
| 5,933,340 A | * | 8/1999 | Adamson | 363/97 |

FOREIGN PATENT DOCUMENTS

| | | |
|---|---|---|
| DE | 19630515 | 2/1998 |
| EP | 0495178 | 7/1992 |
| GB | 2293739 | 4/1996 |
| GB | 2293740 | 4/1996 |
| WO | 9604737 | 2/1996 |

* cited by examiner

*Primary Examiner*—Don N. Vo
(74) *Attorney, Agent, or Firm*—Aaron Waxler

(57) ABSTRACT

A current-limited low-impedance return path is provided between an isolated bus system and the primary supply that provides this isolated bus system. In a preferred embodiment, a voltage follower circuit with an input at ground potential supplies a controlled zero-voltage to a center-tap on the load side of an isolation transformer. This voltage follower circuit provides a low-impedance path for unbalanced communications signals, but is configured to present a high-impedance, or current-limited, path to short-circuit currents. In this manner, the commonmode voltage changes that are caused by parasitic currents between the primary supply and the isolated bus system are minimized by providing the low-impedance path for these currents, and the isolation is maintained by providing the high-impedance path for short-circuit currents.

10 Claims, 1 Drawing Sheet

EMI REDUCTION FOR ISOLATED BUS SYSTEMS

BACKGROUND OF THE INVENTION

1. Field of the Invention

This invention relates to the field of electronics, and in particular to electronic systems that utilize isolated power-bus systems.

2. Description of Related Art

Isolated power-bus systems are commonly employed to isolate a component system from a power source. For example, electronic devices often include a power transformer that provides a dual purpose of voltage step-down and voltage isolation from a mains power source. By isolating the component power supply from the primary voltage source, the bus wires are insensitive to shorts from a bus wire to the supply voltage and ground potentials.

Some systems, such as radios, televisions, and the like, operate substantially independently. Many systems, however, operate in communication with other devices and systems, some of which may be operated from the primary power source. Communications among devices, however, creates a current path between the two devices. Unless the data path between the two devices is balanced perfectly, current travels from one device to the other. If one of the devices is in an isolated system, and the other device is in the primary, non-isolated, system, the current will typically return via a high-impedance parasitic path between the two systems. Although the difference current associated with a communications signal is typically very small, the high-impedance path causes a common-mode voltage on the isolated components, and this common-mode voltage potential is a source for electromagnetic interference (EMI). Providing a low-impedance return path between the component on the isolated bus and the device on the primary supply system can substantially reduce this common-mode voltage, but such a low-impedance path will defeat the purpose of the isolation bus. A short between the wires of the isolated system and the primary supply system can result in a significant amount of short circuit current through the "isolated" component and bus, via the low-impedance return path.

BRIEF SUMMARY OF THE INVENTION

It Is an object of this invention to reduce the common-mode voltage potential on an isolated bus. It is a further object of this invention to reduce the common-mode voltage potential on an isolated bus without substantially affecting the isolation provided.

These objects and others are achieved by providing a current-limited low-impedance return path between an isolated bus system and the primary supply that provides this isolated bus system. In a preferred embodiment, a voltage follower circuit with an input at ground potential supplies a controlled zero-voltage to a center-tap on the load side of an isolation transformer. This voltage follower circuit provides a low-impedance path for unbalanced communications signals, but is configured to present a high-impedance, or current-limited, path to short-circuit currents. In this manner, the commonmode voltage changes that are caused by parasitic currents between the primary supply and the isolated bus system are minimized by providing the low-impedance path for these currents, and the isolation is maintained by providing the high-impedance path for short-circuit currents.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
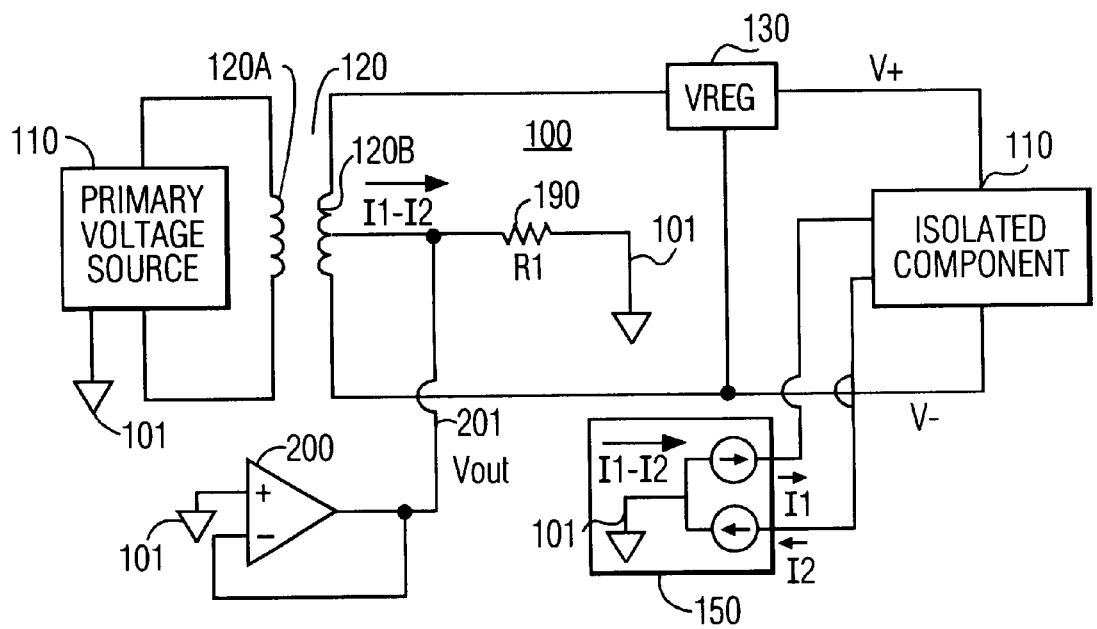
FIG. 1 illustrates an example block diagram of an isolated bus system with a controlled zero-voltage source in accordance with this invention.

FIG. 1 illustrates an example block diagram of an isolated bus system with a controlled zero-voltage source in accordance with this invention. A primary power source 110 provides energy to a supply coil 120A of an isolation transformer 120, and an electromagnetically coupled load coil 120B provides an induced voltage to the isolated bus system 100. A voltage regulator 130 provides a direct-current voltage and current to one or more components 140. The isolation transformer is intended to allow the components 140 to be operated independent of a potential short between a wire in the isolated bus system 100 and the primary power source 110. The isolated bus system 100 includes all components 130, 140, 120B, etc., that do not have a direct current path to the primary power source 110.

Although the subject invention is applicable to any isolated bus system, an automotive electrical system is used herein as a paradigm for this invention, for ease of understanding. The primary power source 110 of an automotive system is the alternator/battery system that provides a nominal 12 volts DC potential, relative to a vehicle ground potential. The input to the supply coil 120A is typically provided by an oscillator that is powered by the primary power source, but could alternatively be an AC output from the alternator in the vehicle that provides energy to the battery and vehicle components when the engine is running. The component 140 could be an airbag deployment system that is operated within the isolated bus system 100 to allow the deployment system 140 to operate independent of a short between a wire in the deployment system 140 and the vehicle ground or the vehicle DC potential. For ease of reference, the term "supply-potential" is used hereinafter to refer to the vehicle ground potential or the vehicle DC potential.

The component 140 receives communications from other devices, for example, a processing device that evaluates signals from sensors and other systems, such as accelerometers, seat belt sensors, and so on. Some or all of these other devices will utilize the primary, non-isolated, power source 110, and are illustrated in FIG. 1 as a differential signal source 150. Differential signaling is preferred for its noise immunity and for its minimal total current transfer between the non-isolated 110 and isolated 100 systems. Ideally, the current I1 in one branch of the differential input is equal and opposite the other current I2 in the other branch, so that the net current transfer is zero. In practice, however, a difference current I1–I2 exists, and introduces a current loop between the isolated 100 and non-isolated 110 systems. As discussed above, this current increases the isolated systems electromagnetic interference emissions, because it appears as a commonmode voltage change on the components of the isolated system 100 due to the high-impedance associated with the non-intended parasitic path through which this current passes. This high-impedance is represented in FIG. 1 as a resistor R1 190 that couples the center-tap of the load coil 120B of the isolation transformer 120 to the ground potential 101 of the non-isolated power source 100. As would be evident to one of ordinary skill in the art, this representation of a parasitic resistance as a bulk resistor R1 190 tied to a particular point in the isolated bus system 100 is provided for ease of illustration. In a conventional system, recognizing that a parasitic path will be formed, a discrete resistor component R1 190 is often provided as illustrated, to provide a reference potential for the isolated bus system, and to provide a characterizable return path model instead of an unknown parasitic path model. This resistor component R1 190 is of very high impedance (mega-ohms) to maintain the intended isolation between the isolated bus system 100 and the primary source 110. As discussed above, the impedance of this resistor R1 190 in a conventional system could be reduced in order to decrease the electromagnetic susceptibility of the isolated bus system 100, but this would also reduce the degree of isolation between the isolated bus system 100 and the primary source 110. Conventionally, a capacitor is provided in parallel to the resistor 190, to provide a low impedance to high-frequency currents, but this solution requires a very large capacitor to provide a low impedance to lower frequency currents. In a preferred embodiment of this invention, a conductance device is employed that can provide a low-impedance current path under a minimal current condition, and a high-impedance current path under a higher current condition. Preferably, the current path is provided from a "center voltage potential" of the isolated bus system 100 to the primary source 110. The choice of node within the primary source 110 is somewhat arbitrary, and the ground potential 101 is selected to ease the embodiments of this invention. The isolation system center voltage is conveniently provided at a center tap of the isolated transformer 120, although other configurations, such as a voltage divider network can also be used to provide a node within the isolated bus system 100 that is at or near the midpoint voltage of the isolated bus system 100, and others, would be evident to one of ordinary skill in the art in view of this disclosure.

In a preferred embodiment of this invention, a controlled zero-voltage source 200 is provided to maintain the potential at the center tap of the load coil 120B of the isolation transformer 120 at ground 101 potential, but without obviating the short-circuit isolation provided by the isolation transformer 120. The controlled zero-voltage source 200 provides a low-impedance path for a return of the difference current I1–I2 that is induced by the imbalance of signal currents between components 150 in the primary system 110 and components 140 in the isolated system 100. Because this difference current I1–I2 does not flow through the high-impedance path R1 190, a high commonmode voltage is not induced, and thereby the potential for electromagnetic interference is reduced. The controlled zero-voltage source 200 is configured to provide a high-impedance current path to large currents, such as a short-circuit current, thereby maintaining the desired short-circuit isolation advantages. A variety of techniques, common in the art, can be used in view of this disclosure to provide a conductance device 200 that presents a low-impedance path to current under a minimal current condition and a high-impedance path to current under a higher current condition.

Figure 2:
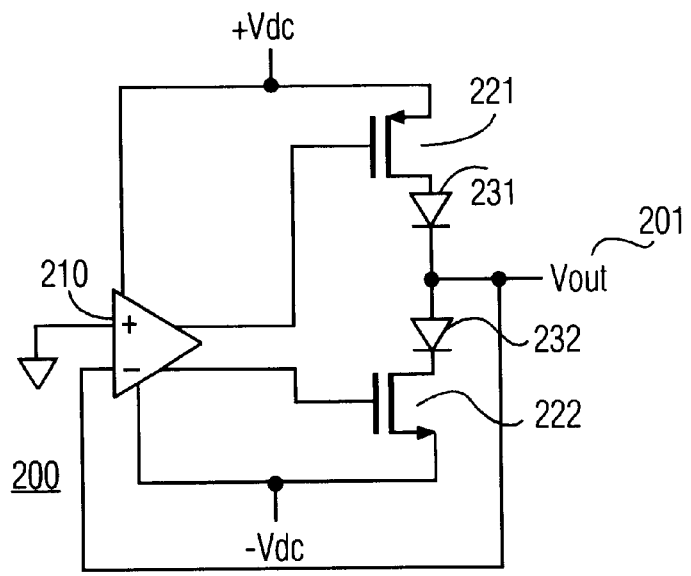
FIG. 2 illustrates an example circuit diagram of a current-limiting zero-voltage source in accordance with this invention.

FIG. 2 illustrates an example circuit diagram of a current-limiting zero-voltage source 200 in accordance with this invention. The source 200 comprises a comparator 210 that is configured as a voltage follower having the ground potential 101 as an input. The comparator 210 controls a current limiter circuit comprising transistors 221, 222, and diodes 231, 232. A positive current difference I1–I2 attempts to raise the potential at Vout 201, causing the comparator 210 to turn on the transistor 222, thereby sinking the positive difference current I1–I2 through an effective low impedance path, and keeping the Vout 201 potential at the ground potential 101. In like manner, a negative current difference I1–I2 attempts to lower the potential at Vout 201, while the comparator 210 and transistor-diode combination 221–231 supply this difference current I1–I2, thereby keeping the Vout 201 potential at the ground potential 101. The transistors 221, 222 also provide a current-limit to the amount of current that is sunk or supplied to Vout 201. In this manner, if the isolated bus system 100 is shorted to the primary system 110, the short-circuit current that can flow through the source 200 is limited, thereby substantially maintaining the intended isolation protection of the isolation transformer 120.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the zero-voltage source 200 of FIG. 2 requires a negative (–Vdc) voltage supply. Alternatively, the zero-voltage source 200 can be configured to be powered by the isolated bus system 100. In this embodiment, the input and output of the source 200 are reversed, so that the output of the voltage follower is connected to the ground potential 101 and the input is connected to the centertap Vout 201. In this manner, a negative voltage supply on the primary supply 110 would not be required. These and other system configuration and optimization features will be evident to one of ordinary skill in the art in view of this disclosure, and are included within the scope of the following claims.

I claim:

1. An isolated bus system comprising:
   an isolation transformer having a supply coil and a load coil,
   a primary-voltage source, operably coupled to the supply coil, that is configured to provide a primary voltage to the supply coil,
   the load coil providing an isolated power-bus system for one or more components, and
   a conductance device that is configured to provide a current path from the isolated power-bus system to a supply-potential that is associated with the primary-voltage source,
   wherein the current path has an impedance that varies in dependence upon a current load that is associated with the current path,
   thereby providing a low-impedance path to signal currents and a high-impedance path to short-circuit currents.

2. The isolated bus system of claim 1, wherein
   the load coil has a first and second tap and a center tap,
   the isolated power-bus system is coupled to the first and second tap, and
   the conductance device provides the current path from the center tap to the supply-potential.

3. The isolated bus system of claim 2, wherein
   the conductance device comprises a current-limited voltage-follower circuit having an input that is connected to the supply-potential and an output that is connected to the center tap.

4. The isolated bus system of claim 3, wherein the current-limited voltage-follower circuit includes:
   a voltage comparator having an output that controls a current-limiting circuit having an output that is connected to the output of the conductance device, a first input that is connected to the supply-potential, and a second input that is connected to the output of the conductance device.

5. An automotive system comprising:
   a primary voltage system having a supply-potential, and
   an isolation system that is configured to receive energy from the primary voltage system and to provide therefrom a secondary potential that is substantially electrically-isolated from the supply-potential,
   the isolation system including
      a conductance device that is configured to provide a current path from the secondary potential to the supply-potential that has an impedance that varies in dependence upon a current load that is associated with the current path, wherein the conductive device comprises a current-limited voltage-follower circuit, thereby providing a low-impedance path to signal currents and a high-impedance path to short-circuit currents.

6. The automotive system of claim 5, further including a component device that receives energy from the secondary potential, and is thereby substantially insulated from short-circuits between the component device and the supply-potential.

7. The automotive system of claim 5, wherein:
   the isolation system includes an isolation transformer having a supply coil and a load coil,
   the load coil has a first and second tap and a center tap,
   the secondary potential is provided via the first and second tap, and
   the conductance device provides the current path from the center tap to the supply-potential.

8. The automotive system of claim 7, wherein
   the conductance device comprises a current-limited voltage-follower circuit having an input that is connected to the supply-potential and an output that is connected to the center tap.

9. The automotive system of claim 8, wherein
   the current-limited voltage-follower circuit includes:
      a voltage comparator having an output that controls a current-limiting circuit having an output that is connected to the output of the conductance device, a first input that is connected to the supply-potential, and a second input that is connected to the output of the conductance device.

10. A method of providing an isolated bus-system comprising:
    enabling a generation of a secondary voltage from a primary voltage, the secondary voltage for providing power to at least one component and being substantially electrically-isolated from the primary voltage,
    enabling a low-impedance path between the secondary voltage and the primary voltage for communication signals, and
    enabling a high-impedance path between the secondary voltage and the primary voltage for short-circuit currents.

* * * * *